(12) United States Patent
Liu et al.

(10) Patent No.: US 11,594,063 B2
(45) Date of Patent: Feb. 28, 2023

(54) DISPLAY MODULE INCLUDING LIGHT-SHIELDING LAYER, AND DISPLAY APPARATUS

(71) Applicant: Xiamen Tianma Micro-Electronics Co., Ltd, Xiamen (CN)

(72) Inventors: Bingping Liu, Xiamen (CN); Xiaoxiao Wu, Xiamen (CN); Guozhao Chen, Xiamen (CN)

(73) Assignee: Xiamen Tianma Micro-Electronics Co., Ltd, Xiamen (CN)

( * ) Notice: Subject to any disclaimer, the term of this patent is extended or adjusted under 35 U.S.C. 154(b) by 117 days.

(21) Appl. No.: 16/730,820

(22) Filed: Dec. 30, 2019

(65) Prior Publication Data
US 2021/0133418 A1     May 6, 2021

(30) Foreign Application Priority Data

Oct. 31, 2019  (CN) .......................... 201911054304.5

(51) Int. Cl.
 *G06V 40/13* (2022.01)
 *G02F 1/1333* (2006.01)
 *G02F 1/1362* (2006.01)

(52) U.S. Cl.
 CPC ...... *G06V 40/1318* (2022.01); *G02F 1/13338* (2013.01); *G02F 1/136209* (2013.01)

(58) Field of Classification Search
 CPC ........ G06K 9/0004; G06K 9/00; G06F 21/32; G06F 3/042; G02F 1/133512;
 (Continued)

(56) References Cited

U.S. PATENT DOCUMENTS

2008/0246708 A1* 10/2008 Ishiguro .............. G02F 1/13318
 345/87
2008/0259051 A1* 10/2008 Ota ........................ G06F 3/0412
 345/175
(Continued)

FOREIGN PATENT DOCUMENTS

CN         1187838 C      2/2005
CN      105336751 A  *  2/2016  ........... H01L 27/146
(Continued)

OTHER PUBLICATIONS

State Intellectual Property Office of the People's Republic of China, First Office Action, CN Application No. 2019110543045, dated Nov. 1, 2021.

*Primary Examiner* — Yuzhen Shen
(74) *Attorney, Agent, or Firm* — Christensen O'Connor Johnson Kindness PLLC

(57) ABSTRACT

Provided are a display module and a display apparatus. The display module includes: sub-pixels arranged in an array along a first direction and a second direction; and an array substrate including an underlay substrate, a fingerprint recognition unit, and a first light-shielding layer. The fingerprint recognition unit includes a photosensitive semiconductor layer, and an orthographic projection of the photosensitive semiconductor layer on a plane of the underlay substrate is located between two adjacent sub-pixels along the second direction. The first light-shielding layer is located on a side of the photosensitive semiconductor layer close to the underlay substrate, and an orthographic projection of the first light-shielding layer on a plane of the photosensitive semiconductor layer completely covers the photosensitive semiconductor layer, and along the first direction, a length of the first light-shielding layer is larger than or equal to twice a length of each of the plurality of sub-pixels.

18 Claims, 11 Drawing Sheets

(58) Field of Classification Search
CPC ......... G02F 1/136209; H01L 29/78633; H01L 27/14623
See application file for complete search history.

(56) References Cited

U.S. PATENT DOCUMENTS

| | | | |
|---|---|---|---|
| 2018/0052359 A1* | 2/2018 | Umemoto | G09F 9/30 |
| 2018/0096188 A1* | 4/2018 | Xu | G06K 9/00087 |
| 2019/0187756 A1* | 6/2019 | Sun | G06K 9/00087 |
| 2019/0296055 A1* | 9/2019 | Lius | H01L 27/1214 |
| 2020/0044093 A1* | 2/2020 | Liu | H01L 21/0274 |
| 2020/0104008 A1* | 4/2020 | Yan | G06V 40/1318 |
| 2020/0135959 A1* | 4/2020 | Shibata | H01L 31/02019 |
| 2021/0081638 A1* | 3/2021 | Lius | G02F 1/13338 |
| 2021/0211564 A1* | 7/2021 | Liu | H01L 31/1136 |

FOREIGN PATENT DOCUMENTS

| | | |
|---|---|---|
| CN | 106684202 A | 5/2017 |
| CN | 110008885 A | 7/2019 |
| CN | 110286514 A | 9/2019 |
| CN | 110309775 A | 10/2019 |

\* cited by examiner

DISPLAY MODULE INCLUDING LIGHT-SHIELDING LAYER, AND DISPLAY APPARATUS

CROSS-REFERENCE TO RELATED APPLICATIONS

The present application claims priority to Chinese Patent Application No. 201911054304.5, filed on Oct. 31, 2019, the content of which is incorporated herein by reference in its entirety.

TECHNICAL FIELD

The present disclosure relates to the field of display technologies, and in particular, to a display module and a display apparatus.

BACKGROUND

In recent years, with the continuous development of the display technology, more display apparatuses adopt fingerprint recognition for the purpose of user privacy protection. When operating the display apparatus with a fingerprint recognition function, the user only needs to touch a display screen with a finger to realize permission verification, which is relatively simple.

With respect to the display apparatus adopting the optical fingerprint recognition technology, during the process of fingerprint recognition, light emitted by a light source is reflected, via a touch body such as a finger, into a fingerprint recognition unit. The fingerprint recognition unit recognizes fingerprint based on a difference in light intensity of the reflected light at positions of valleys and ridges of the fingerprint. However, based on structures of the existing display apparatuses, during the process of fingerprint recognition, in addition to the reflected light reflected by the fingerprint to the fingerprint recognition unit, light that is not reflected by the fingerprint, i.e., light that cannot reflect fingerprint information, may also enter the fingerprint recognition unit, affecting accuracy of fingerprint recognition.

SUMMARY

In view of this, an embodiment of the present disclosure provides a display module and a display apparatus, so as to prevent light that cannot reveal the fingerprint information from entering a fingerprint recognition unit, thereby improving accuracy of fingerprint recognition.

In an aspect, the present disclosure provides a display module, including: a plurality of sub-pixels arranged in an array along a first direction and a second direction, the first direction intersecting the second direction; and an array substrate. The array substrate includes an underlay substrate, a fingerprint recognition unit, and a first light-shielding layer. The fingerprint recognition unit includes a photosensitive semiconductor layer, and an orthographic projection of the photosensitive semiconductor layer on a plane of the underlay substrate is located between two sub-pixels of the plurality of sub-pixels that are adjacent along the second direction. The first light-shielding layer is located on a side of the photosensitive semiconductor layer close to the underlay substrate, and an orthographic projection of the first light-shielding layer on a plane of the photosensitive semiconductor layer completely covers the photosensitive semiconductor layer, and a length of the first light-shielding layer along the first direction is larger than or equal to twice a length of each of the plurality of sub-pixels along the first direction.

In another aspect, the present disclosure provides a display apparatus including the above display module.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings.

DESCRIPTION OF EMBODIMENTS

In order to explain technical solutions of the present disclosure, embodiments of the present disclosure are described in detail with reference to the drawings.

It should be clear that the described embodiments are merely part of the embodiments of the present disclosure rather than all of the embodiments. All other embodiments obtained by those skilled in the art shall fall into the protection scope of the present disclosure.

The terms used in the embodiments of the present disclosure are merely for the purpose of describing particular embodiments but not intended to limit the present disclosure. Unless otherwise noted in the context, the singular form expressions "a", "an", "the" or "said" used in the embodiments and appended claims of the present disclosure are also intended to represent a plural form.

It should be understood that the term "and/or" as used herein is merely an association describing the associated object, indicating that there may be three relationships. For example, A and/or B may indicate three cases: only A exists; A and B exist concurrently; only B exists. In addition, a character "/" herein generally indicates that the contextual objects are in an "or" relationship.

It should be understood that although terms first, second, etc. may be used to describe the light-shielding layers in the embodiments of the present disclosure, but these light-shielding layers should not be limited to these terms. These terms are only used to distinguish each of the different light-shielding layers from one another. For example, without departing from the scope of the embodiments of the present disclosure, the first light-shielding layer may also be referred to as the second light-shielding layer, and similarly, the second light-shielding layer may also be referred to as the first light-shielding layer.

Figure 1:
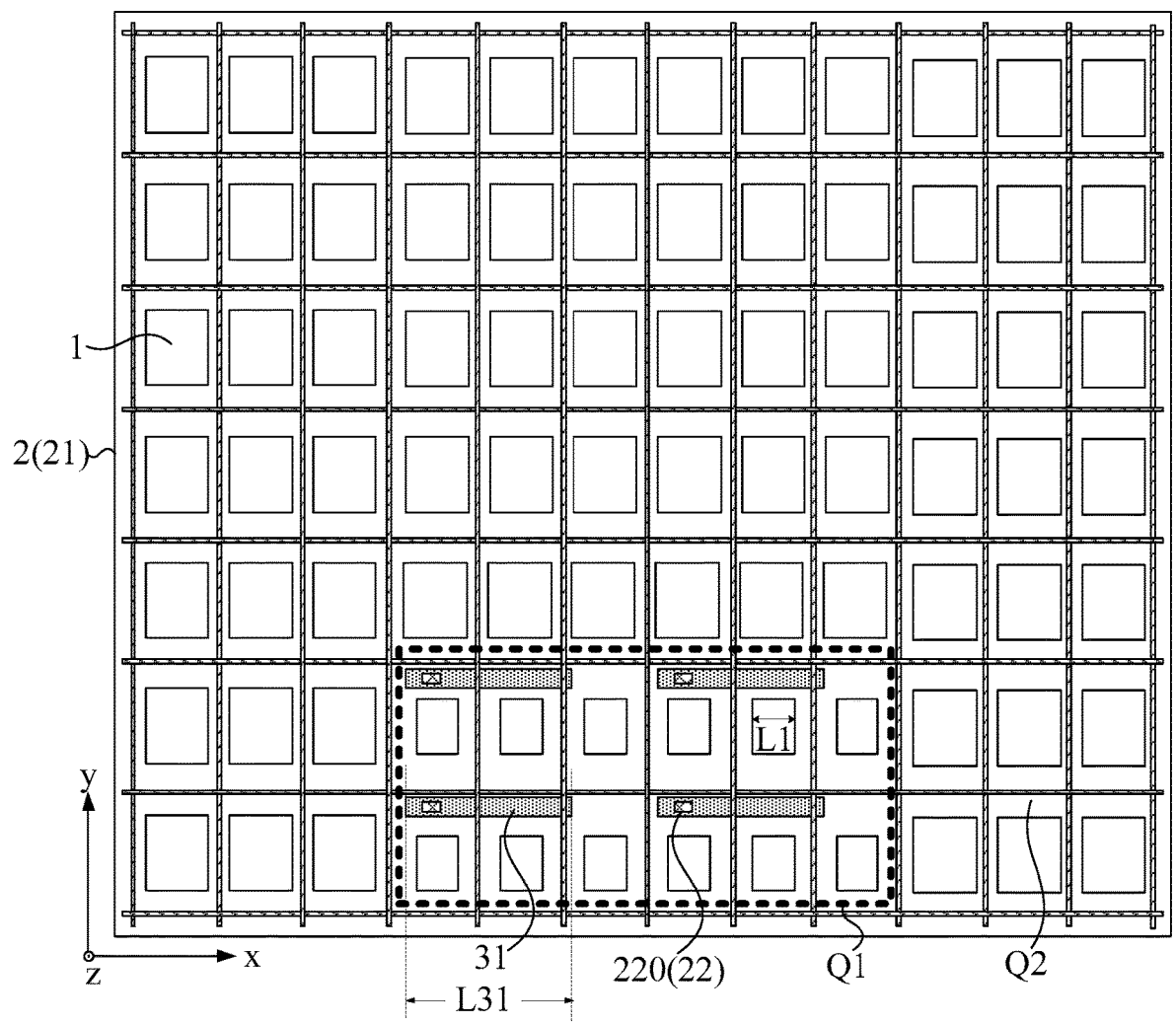
FIG. 1 is a schematic top view of a display module according to an embodiment of the present disclosure.
Figure 2:
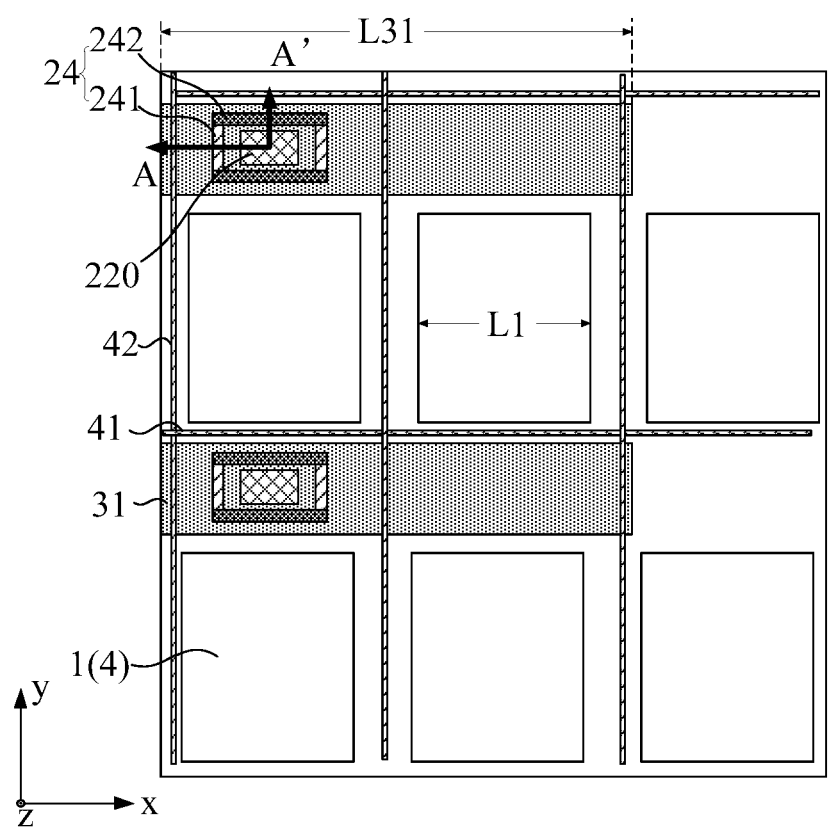
FIG. 2 is an enlarged schematic view of a position of a fingerprint recognition unit in the display module shown in FIG. 1.
Figure 3:
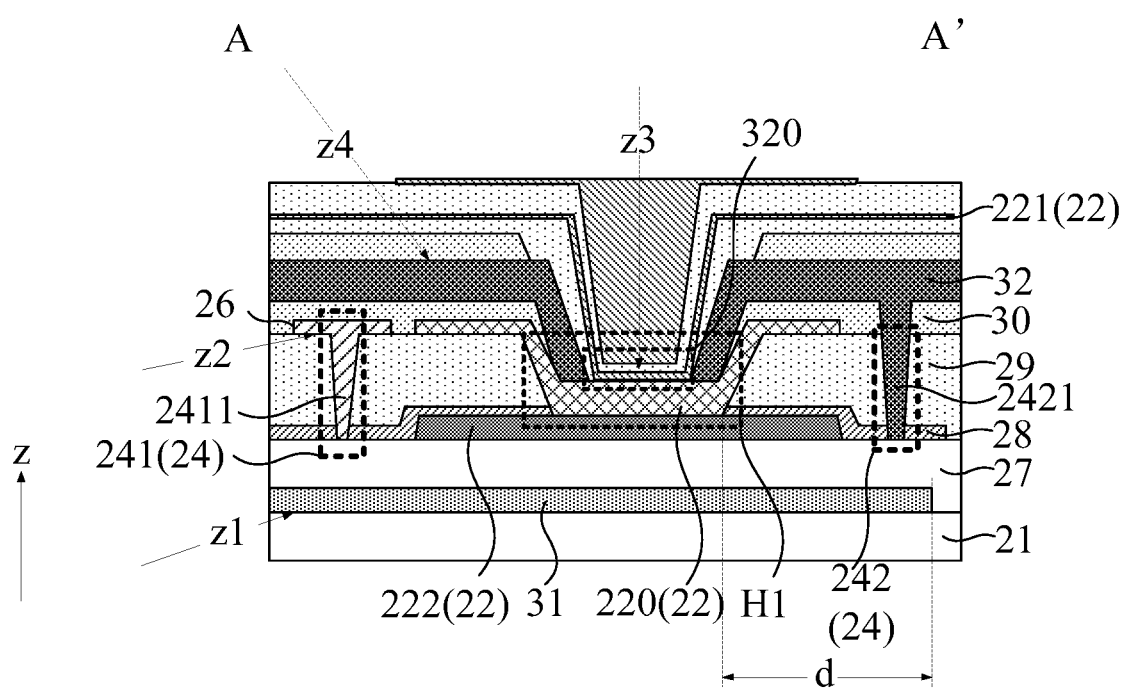
FIG. 3 is a schematic cross-sectional view of an array substrate in the display module shown in FIG. 2 taken along AA'.

An embodiment of the present disclosure provides a display module, as shown in FIG. 1, FIG. 2 and FIG. 3. FIG. 1 is a schematic top view of a display module according to an embodiment of the present disclosure, FIG. 2 is an enlarged schematic view of a position of a fingerprint recognition unit in the display module shown in FIG. 1, and FIG. 3 is a schematic cross-sectional view of an array substrate in the display module shown in FIG. 2 taken along AA'. The display module includes a plurality of sub-pixels 1 that are arranged in an array along a first direction x and a second direction y, and the first direction x intersects the second direction y. The display module further includes an array substrate 2. The array substrate 2 includes an underlay substrate 21 and a fingerprint recognition unit 22. The fingerprint recognition unit 22 includes a photosensitive semiconductor layer 220. The photosensitive semiconductor layer 220 is formed of a semiconductor material having photosensitive characteristics. When light is irradiating, photo-generated carriers are generated in the photosensitive semiconductor layer 220. A change in intensity of the light irradiation may result in a change in density of the photo-generated carriers generated in the photosensitive semiconductor layer 220 and thus can change electrical characteristics of the fingerprint recognition unit 22 including the photosensitive semiconductor layer 220.

As shown in FIG. 1 and FIG. 2, in the present embodiment of the disclosure, along the second direction y, an orthographic projection of the photosensitive semiconductor layer 220 is formed on a plane of the underlay substrate 21 between the adjacent two sub-pixels 1. In this way, light beams, which are reflected back from a touch body, are not being blocked by the sub-pixels 1 when they are incident on the photosensitive semiconductor layer 220, thereby a normal operation of the fingerprint recognition.

As shown in FIG. 1, FIG. 2 and FIG. 3, the array substrate 2 further includes a first light-shielding layer 31. The first light-shielding layer 31 is located on a side of the photosensitive semiconductor layer 220 close to the underlay substrate 21, and an orthographic projection of the first light-shielding layer 31 on a plane of the photosensitive semiconductor layer 220 completely covers the photosensitive semiconductor layer 220.

As shown in FIG. 1 and FIG. 2, a length L31 of the first light-shielding layer 31 along the first direction x is larger than or equal to twice a length of the sub-pixel 1 along the first direction x. An example of such condition is when a length of the sub-pixel 1 is close to the first light-shielding layer 31 in the first direction x is L1, L31 and L1 satisfies: $L31 \geq 2L1$.

For example, the display module further includes a light source for the fingerprint recognition. When performing the fingerprint recognition, an existing light source in the display module can be used as the light source for the fingerprint recognition. For example, in a liquid crystal display module, a backlight module can be utilized as the light source for fingerprint recognition; and in an organic light emitting display module, an organic light emitting device can be utilized as the light source for fingerprint recognition. When performing the fingerprint recognition, light emitted by the light source is incident to the touch body located on a light emission side of the display module, and the touch body reflects the incident light from the light source to the photosensitive semiconductor layer 220 of the fingerprint recognition unit 22. The photosensitive semiconductor layer 220 is capable of converting a received light signal into an electrical signal and transmitting it to a processing unit (not shown) connected to the fingerprint recognition unit 22. The processing unit can recognize valleys and ridges of a fingerprint according to intensity of the received electrical signal, so as to recognize the fingerprint of the touch body. In this process, a portion of light, which is emitted by the light source and not reflected by touch body, as the light transmitted in a direction z1 shown in FIG. 3, is stray light and thus cannot represent the fingerprint information of the touch body as this portion is not reflected by the touch body. The first light-shielding layer 31 located on the side of the photosensitive semiconductor layer 220 close to the underlay substrate 21 can block this portion of stray light from being incident on the photosensitive semiconductor layer 220.

According to the above description about the operation process of the fingerprint recognition, by providing the first light-shielding layer 31 in the array substrate 2 and also on the side of the photosensitive semiconductor layer 220 close to the underlay substrate 21 in the present disclosure, the orthographic projection of the first light-shielding layer 31 on the plane of the photosensitive semiconductor layer 220 completely covers the photosensitive semiconductor layer 220. As a result, the first light-shielding layer 31 blocks the light that is emitted by the light source from the other side of the underlay substrate 21 and is incident directly to the photosensitive semiconductor layer 220. That is, the stray light that cannot reveal the fingerprint recognition information is prevented from being incident to the photosensitive semiconductor layer 220, so as to avoid interference with the fingerprint recognition, thereby improving accuracy of the fingerprint recognition.

Moreover, in the embodiment of the present disclosure, by setting the length L31 of the first light-shielding layer 31 along the first direction x to be larger than or equal to twice the length of the sub-pixel 1 along the first direction x, the first light-shielding layer 31 has an area, which is sufficient to block the stray light emitted by the light source and incident to the photosensitive semiconductor layer 220 from different directions, thereby further guaranteeing the accuracy of fingerprint recognition.

It should be noted that a shape and a size of the sub-pixel 1 in FIG. 1 and FIG. 2 are merely illustrative. In fact, the shape and the size of each sub-pixel 1 can be differently designed according to various display requirements, which are not limited in the embodiments of the present disclosure.

In an embodiment, the first light-shielding layer 31 can be formed of a material with a relatively high reflectivity. For example, a metal material is selected to form the first light-shielding layer 31, so as to reflect the stray light, thereby preventing the stray light from being incident to the photosensitive semiconductor layer 220. Alternatively, a material having a relatively high light absorptivity, for example a light absorbing material such as black resin, may be selected to form the first light-shielding layer 31, so as to prevent, through absorption, the stray light from being incident to the photosensitive semiconductor layer 220.

For example, as shown in FIG. 3, a shortest distance d between an edge of the orthographic projection of the first light-shielding layer 31 on the plane of the photosensitive semiconductor layer 220 and an edge of the photosensitive semiconductor layer 220 satisfies d>6.5 µm. That is, the first light-shielding layer 31 can be extended outward by a certain distance with respect to the photosensitive semiconductor layer 220 as a center, such that the light incident from a relatively large region around periphery of the photosensitive semiconductor layer 220 is blocked by the first light-shielding layer 31, thereby further guaranteeing the accuracy of fingerprint recognition.

For example, in the embodiment of the present disclosure as shown in FIG. 1, the display module includes a fingerprint recognition region Q1 (shown by a dotted box in FIG. 1) and a non-fingerprint recognition region Q2. The above photosensitive semiconductor layer 220 is located in the fingerprint recognition region Q1. As described above, the light reflected back by the touch body is prevented from being blocked by the sub-pixels 1 when incident to the photosensitive semiconductor layer 220, so as to the normal operation of the fingerprint recognition, in the embodiment of the present disclosure, along the second direction y, the orthographic projection of the photosensitive semiconductor layer 220 on the plane of the underlay substrate 21 is disposed between adjacent two sub-pixels 1. In view of this, in the embodiment as shown in FIG. 1, by setting the area of the sub-pixel 1 located in the fingerprint recognition region Q1 to be smaller than the area of the sub-pixel 1 located in the non-fingerprint recognition region Q2, an area of a region between two sub-pixels 1 adjacent in the second direction y in the fingerprint recognition region Q1 can be increased to provide a sufficient installation space for the photosensitive semiconductor layer 220. Thus, an amount of light entering the photosensitive semiconductor layer 220 can also be ensured, thereby guaranteeing the accuracy of fingerprint recognition.

It should be noted that FIG. 1 illustrates the display module of a partial region that is used as the fingerprint recognition region Q1. In other optional embodiments of the present disclosure, all display regions of the display module may also be used as the fingerprint recognition region Q1 as long as enough installation space of the photosensitive semiconductor layer 220 can be ensured. That is, display regions of the display module are each provided with the fingerprint recognition unit including the photosensitive semiconductor layer 220.

For example, as shown in FIG. 2 and FIG. 3, the array substrate 2 further includes a light-shielding structure 24, and the light-shielding structure 24 is located on a side of the first light-shielding layer 31 facing away from the underlay substrate 21.

For example, as shown in FIG. 3, when performing fingerprint recognition, during the transmission of light emitted by the light source in the display module, a reflection of light inevitably occurs at an interface between adjacent two film layers due to the presence of film layers having different refractive indexes in the array substrate 2. As shown in FIG. 3, the light propagating in a direction z2 is reflected from a film layer in the array substrate 2 and then the reflected light is incident to the photosensitive semiconductor layer 220 from a side surface of the photosensitive semiconductor layer 220, i.e., from the side of the first light-shielding layer 31 facing away from the underlay substrate 21. This portion of light that is not reflected by the touch body is also referred to as the stray light. The light-shielding structure 24 is provided to block the stray light from being incident to the photosensitive semiconductor layer 220, where the stray light is incident to the photosensitive semiconductor layer 220 from the side from the photosensitive semiconductor layer 220, i.e., from the side surface of the first light-shielding layer 31 facing away from the underlay substrate 21.

It can be seen from the above description, in the embodiment of the present disclosure, by providing the first light-shielding layer 31 on the side of the photosensitive semiconductor layer 220 close to the underlay substrate 21, it is possible to block the incident stray light from the side of the photosensitive semiconductor layer 220 close to the underlay substrate 21, i.e., from a lower side of the photosensitive semiconductor layer 220 in view of FIG. 3. Further, by providing the light-shielding structure 24 on the side of the first light-shielding layer 31 facing away from the underlay substrate 21, it is possible to block the incidence of the stray light coming from the side of the first light-shielding layer 31 facing away from the underlay substrate 21, i.e., from a side of the photosensitive semiconductor layer 220 in view of FIG. 3. That is, the first light-shielding layer 31 and the light-shielding structure 24 define a space where the photosensitive semiconductor layer 220 is enclosed, so as to cooperatively block the stray light incident to the photosensitive semiconductor layer 220 from different directions around the photosensitive semiconductor layer 220, thereby improving the accuracy of fingerprint recognition.

In an embodiment of the present disclosure, the first light-shielding layer 31 and the light-shielding structure 24 are designed with appropriate shapes due to the different positions of the first light-shielding layer 31 and the light-shielding structure 24. For example, under the premise that the first light-shielding layer 31 and the light-shielding structure 24 effectively block the stray light, a thickness of the first light-shielding layer 31 is designed to be relatively small, and the area of the orthographic projection on the plane of the underlay substrate 21 is designed to be relatively large, i.e., the first light-shielding layer 31 has a substantially layered structure. For example, a thickness of the light-shielding structure 24 is designed to be relatively large, and the area of the orthographic projection on the plane of the underlay substrate 21 is designed to be relatively small, i.e., the light-shielding structure 24 has a substantially columnar structure. It is also possible that the thickness of the first light-shielding layer 31 is relatively large, or the area of the orthographic projection of the light-shielding structure 24 on the plane of the underlay substrate 21 is relatively large, which is not specifically limited in the embodiment of the present disclosure.

For example, as shown in FIG. 2 and FIG. 3, the orthographic projection of the light-shielding structure 24 on the plane of the underlay substrate 21 at least partially overlaps the orthographic projection of the first light-shielding layer 31 on the plane of the underlay substrate 21, so that the light-shielding structure 24 and the first light-shielding layer 31 can sufficiently enclose the photosensitive semiconductor layer 220, thereby sufficiently blocking the stray light incident to the photosensitive semiconductor layer 220 from various directions around the photosensitive semiconductor layer 220. In an embodiment of the present disclosure, the orthographic projection of the light-shielding structure 24 on the plane of the underlay substrate 21 may be disposed in the first light-shielding layer 31, so that there is no gap between the orthographic projections of the light-shielding structure 24 and the first light-shielding layer 31 on the plane of the underlay substrate 21. Thus, the stray light incident from the gap between the light-shielding structure 24 and the first light-shielding layer 31 can be prevented from being incident to the photosensitive semiconductor layer 220.

For example, as shown in FIG. 2, the orthographic projection of the light-shielding structure 24 on the plane of the photosensitive semiconductor layer 220 surrounds the photosensitive semiconductor layer 220. It should be noted that the wording "surround" refers to continuous and uninterrupted surrounding. That is, the projection of the light-shielding structure 24 on the plane of the photosensitive semiconductor layer 220 is a closed loop, and the photosensitive semiconductor layer 220 is disposed in the closed loop.

For example, as shown in FIG. 2 and FIG. 3, when providing the light-shielding structure 24, the orthographic projection of the light-shielding structure 24 on the plane of the underlay substrate 21 may not overlap with the orthographic projection of the photosensitive semiconductor layer 220, in order to ensure that the photosensitive semiconductor layer 220 can normally receive light reflected by the fingerprint without the influence of the light-shielding structure 24.

Figure 4:
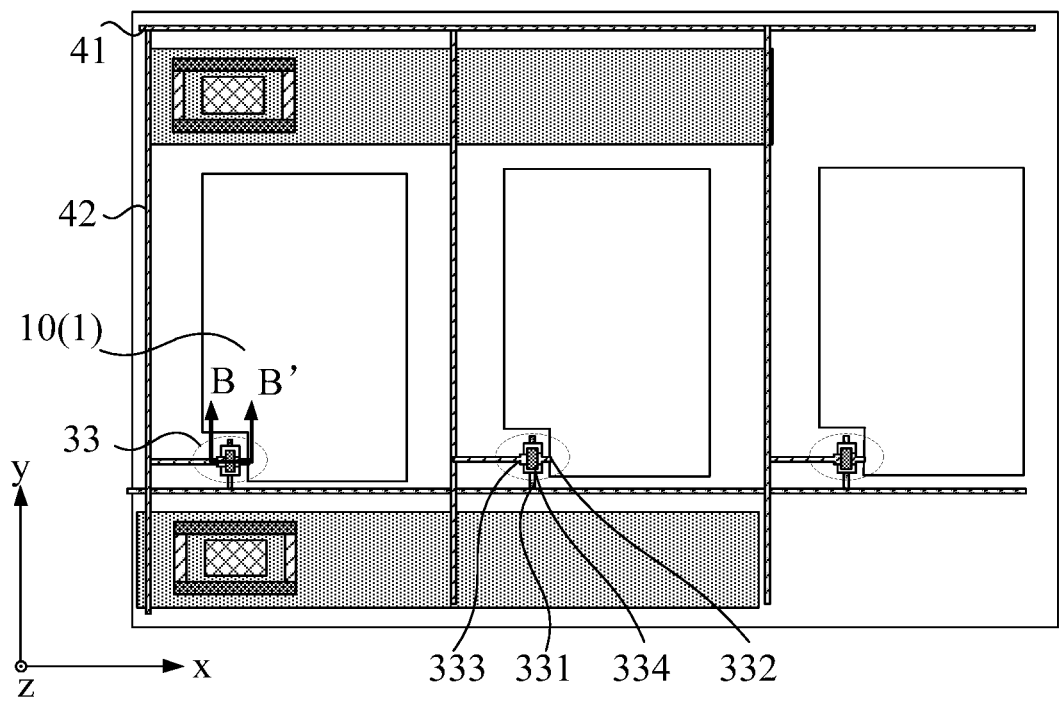
FIG. 4 is another enlarged schematic view of a position of a fingerprint recognition unit in the display module shown in FIG. 1.
Figure 5:
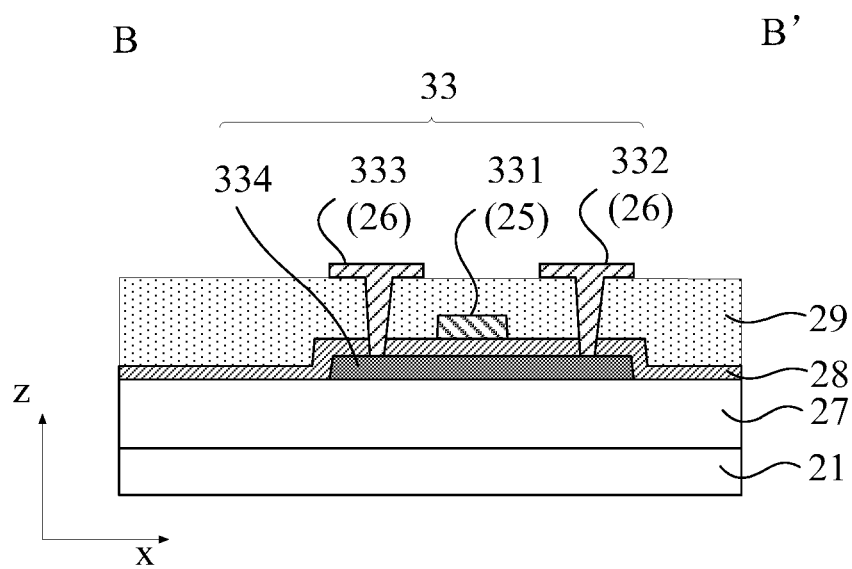
FIG. 5 is a schematic cross-sectional view of an array substrate in the display module shown in FIG. 4 taken along BB'.

FIG. 4 is another enlarged schematic view of a position of the fingerprint recognition unit in the display module shown in FIG. 1, and FIG. 5 is a schematic cross-sectional view of the array substrate in the display module shown in FIG. 4 taken along BB'. As shown in FIG. 4 and FIG. 5, the array substrate 2 further includes a plurality of scan lines 41, a plurality of data lines 42, and a plurality of thin film transistors 33 connected to the plurality of scan lines 41 and the plurality of data lines 42. The scan lines 41 extend along the first direction x and are arranged along the second direction y, and the data lines 42 extend along the second direction y and are arranged along the first direction x. The scan lines 41 and the data lines 42 intersect to define a plurality of sub-pixel regions 10, and the sub-pixel 1 is located in the sub-pixel region 10. The thin film transistor 33 includes a gate 331, a source 333, a drain 332, and an active layer 334. Correspondingly, in combination with FIG. 3 and FIG. 5, the array substrate 2 further includes a gate metal layer 25 (not shown in FIG. 3), a source/drain metal layer 26, a buffer layer 27, a gate insulation layer 28, and an interlayer insulation layer 29. The buffer layer 27 is located on a side of the first light-shielding layer 31 facing away from the underlay substrate 21. The gate insulation layer 28 is located on a side of the buffer layer 27 facing away from the underlay substrate 21. The gate metal layer 25 is located on a side of the gate insulation layer 28 facing away from the underlay substrate 21. The interlayer insulation layer 29 is located on a side of the gate metal layer 25 facing away from the underlay substrate 21. The source/drain metal layer 26 is located on a side of the interlayer insulation layer 29 facing away from the underlay substrate 21. The gate 331 and the scan lines 41 are located on the gate metal layer 25. The source 333, the drain 332, and the data lines 42 are located on the source/drain metal layer 26. The active layer 334 is located between the buffer layer 27 and the gate insulation layer 28.

As shown in FIG. 3, the gate insulation layer 28 and the interlayer insulation layer 29 include a first via hole H1, and the photosensitive semiconductor layer 220 is located in the first via hole H1. The first via hole H1 is configured to define the position of the photosensitive semiconductor layer 220. It should be noted that in the display module, since the film layers including the photosensitive semiconductor layer 220 are each prepared with patterning processes such as film formation, exposure and development, considering alignment accuracy of a mask during the preparation of the film layers, the area of the photosensitive semiconductor layer 220 can be configured to be relatively large, in order to ensure good contact between the photosensitive semiconductor layer 220 and other film layers (such as a signal transmission layer participating in signal transmission in a fingerprint recognition circuit) in the display module. As shown in FIG. 3, a portion of the photosensitive semiconductor layer 220 may protrude from the first via hole H1. The protruding portion can be subsequently blocked by other light-shielding film layers, and the protruding portion may not be involved in photosensitization. Therefore, the shortest distance d between the edge of the orthographic projection of the first light-shielding layer 31 on the plane of the photosensitive semiconductor layer 220 and the edge of the photosensitive semiconductor layer 220 can be referred to as the shortest distance between the edge of the orthographic projection of the first light-shielding layer 31 on the plane of the photosensitive semiconductor layer 220 and the edge of the photosensitive semiconductor layer 220 involved in photosensitization in the first via hole H1, i.e., the shortest distance between the edge of the orthographic projection of the first light-shielding layer 31 on the plane of the photosensitive semiconductor layer 220 and the edge of the first via hole H1.

For example, as shown in FIG. 3, the array substrate 2 further includes a second light-shielding layer 32, and the second light-shielding layer 32 is located above the side of the source/drain metal layer 26 facing away from the underlay substrate 21. A planarization layer 30 is disposed between the source/drain metal layer 26 and the second light-shielding layer 32. The second light-shielding layer 32 includes a hollow portion 320. The hollow portion 320 at least partially overlaps the photosensitive semiconductor layer 220 in the direction perpendicular to the plane of the underlay substrate 21, and without being affected, the photosensitive semiconductor layer 220 can normally receive the light reflected by the fingerprint.

As described above, in the embodiment of the present disclosure, by providing the first light-shielding layer 31 on the side of the photosensitive semiconductor layer 220 close to the underlay substrate 21 and providing the light-shielding structure 24 on the side of the first light-shielding layer 31 facing away from the underlay substrate 21, the stray light can be prevented from being incident to the photosensitive semiconductor layer 220. In addition, in the embodiment of the present disclosure, the second light-shielding layer 32 is also provided on the side of the photosensitive semiconductor layer 220 facing away from the underlay substrate 21, and the hollow portion 320 is formed in the second light-shielding layer 32 and the hollow portion 320 at least partially overlaps the photosensitive semiconductor layer 220. In this way, when performing fingerprint recognition, the light reflected by the touch body at a certain position, such as light propagating in a direction z3 as shown in FIG. 3, can be incident to the photosensitive semiconductor layer 220 through the hollow portion 320. The light reflected by the touch body at an adjacent position, such as light propagating in a direction z4 in FIG. 3, can be blocked by the second light-shielding layer 32, such that the fingerprint-reflected light at different positions can be prevented from being irradiated to the same photosensitive semiconductor layer 220, thereby further ensuring accuracy of fingerprint recognition.

For example, the material of the second light-shielding layer 32 includes light absorbing resin.

The material and the thickness of the light-shielding structure 24 can be various, as described below.

As shown in FIGS. 2 and 3, the light-shielding structure 24 includes a first light-shielding structure 241 and a second light-shielding structure 242, and their orthographic projections on the plane of the underlay substrate 21 are at different positions. The orthographic projections of the first light-shielding structure 241 and the photosensitive semiconductor layer 220 on the plane of the underlay substrate 21 are arranged along the first direction x. The orthographic projections of the second light-shielding structure 242 and the photosensitive semiconductor layer 220 on the plane of the underlay substrate 21 are arranged in the second direction y.

As shown in FIG. 3, the first light-shielding structure 241 includes a first sub-light-shielding structure 2411 penetrating the interlayer insulation layer 29 and the gate insulation layer 28. The second light-shielding structure 242 includes a second sub-light-shielding structure 2421 penetrating the interlayer insulation layer 29 and the gate insulation layer 28. That is, a thickness of the first sub-light-shielding structure 2411 and a thickness of the second sub-light-shielding structure 2421 are at least equal to a thickness of the interlayer insulation layer 29 together with the gate insulation layer 28. Thus, all the stray light that is emitted from the interlayer insulation layer 29 or the gate insulation layer 28 towards the photosensitive semiconductor layer 220 can be blocked by the first sub-light-shielding structure 2411 or the second sub-light-shielding structure 2421.

Figure 6:
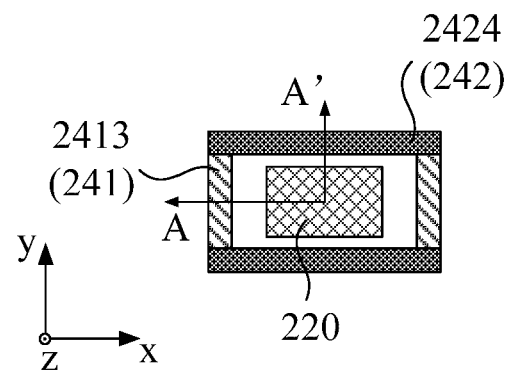
FIG. 6 is a schematic top view of a light-shielding structure and a photosensitive semiconductor layer according to an embodiment of the present disclosure.
Figure 7:
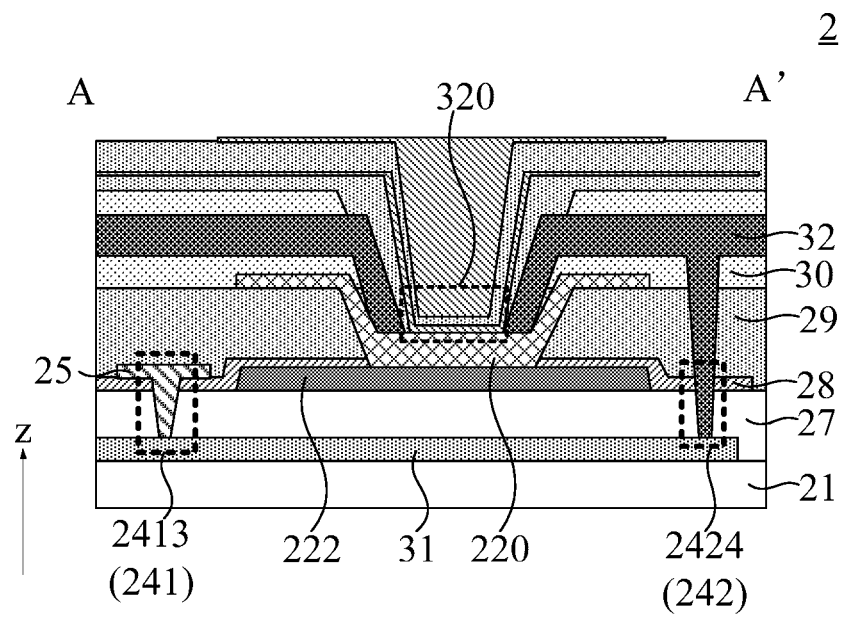
FIG. 7 is a schematic cross-sectional view of FIG. 6 taken along AA'.

FIG. 6 is a schematic top view of a light-shielding structure and a photosensitive semiconductor layer according to an embodiment of the present disclosure, and FIG. 7 is a schematic cross-sectional view taken along AA' of FIG. 6. As shown in FIG. 6 and FIG. 7, in the embodiment of the present disclosure, it is also possible that the first light-shielding structure 241 includes a third sub-light-shielding structure 2413 penetrating the gate insulation layer 28 and the buffer layer 27, and also the second light-shielding structure 242 includes a fourth sub-light-shielding structure 2424 penetrating the gate insulation layer 28 and the buffer layer 27. That is, a thickness of the third sub-light-shielding structure 2413 and a thickness of the fourth sub-light-shielding structure 2424 are configured to be at least equal to a thickness of the gate insulation layer 28 together with the buffer layer 27. Thus, the stray light that is emitted from the gate insulation layer 28 or the buffer layer 27 towards the photosensitive semiconductor layer 220 can be blocked by the third sub-light-shielding structure 2413 or the fourth sub-light-shielding structure 2424.

Figure 8:
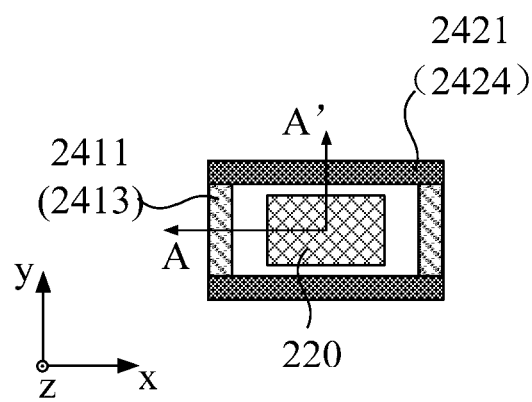
FIG. 8 is another schematic top view of a light-shielding structure and a photosensitive semiconductor layer according to an embodiment of the present disclosure.
Figure 9:
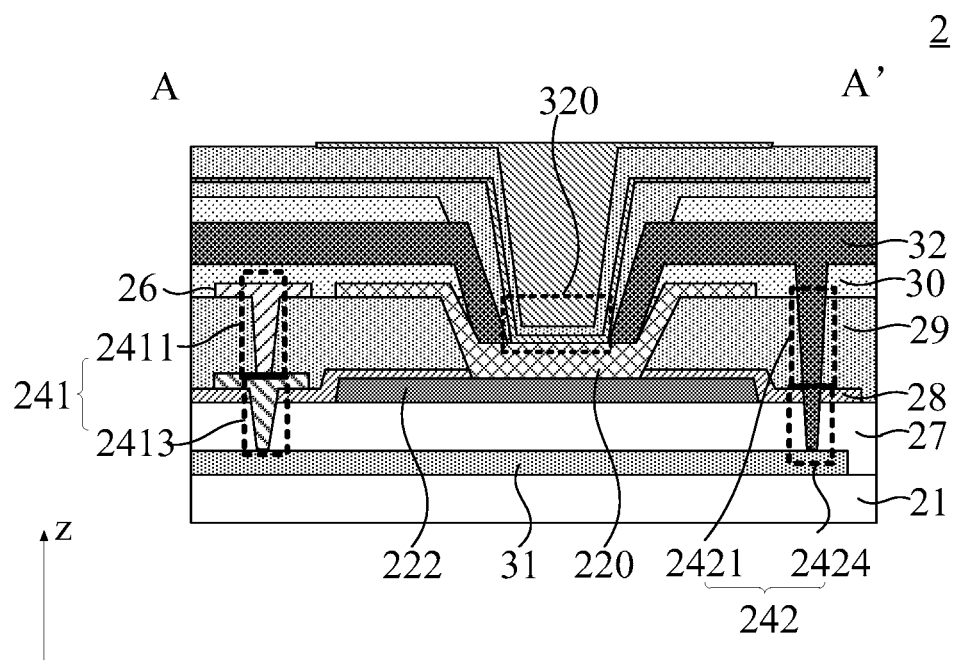
FIG. 9 is a schematic cross-sectional view of FIG. 8 taken along AA'.

Alternatively, in an embodiment of the present disclosure, the first light-shielding structure 241 may have a greater thickness. FIG. 8 is another schematic top view of a light-shielding structure and a photosensitive semiconductor layer according to an embodiment of the present disclosure, and FIG. 9 is a schematic cross-sectional view of FIG. 8 taken along AA'. As shown in FIG. 8 and FIG. 9, in the embodiments of the present disclosure, the first light-shielding structure 241 may include the first sub-light-shielding structure 2411 shown in FIG. 3 and the third sub-light-shielding structure 2413 shown in FIG. 7. The first sub-light-shielding structure 2411 penetrates the interlayer insulation layer 29 and the gate insulation layer 28, and the third sub-light-shielding structure 2413 penetrates the gate insulation layer 28 and the buffer layer 27. In addition, the second light-shielding structure 242 includes the second sub-light-shielding structure 2421 shown in FIG. 3 and the fourth sub-light-shielding structure 2424 shown in FIG. 7. The second sub-light-shielding structure 2421 penetrates the interlayer insulation layer 29 and the gate insulation layer 28, and the fourth sub-light-shielding structure 2424 penetrates the gate insulation layer 28 and the buffer layer 27. Such configurations in this embodiment of the present disclosure can increase the thickness of the first light-shielding structure 241, which includes the first sub-light-shielding structure 2411 and the third sub-light-shielding structure 2413. Thus, the thickness of the first light-shielding structure 241 is at least equal to a thickness of the interlayer insulation layer 29 together with the gate insulation layer 28 and the buffer layer 27. Moreover, the thickness of the second light-shielding structure 242 including the second sub-light-shielding structure 2421 and the fourth sub-light-shielding structure 2424 is also increased, and thus the thickness of the second light-shielding structure 242 can be at least equal to the thickness of the interlayer insulation layer 29 together with the gate insulation layer 28 and the buffer layer 27. In this way, all the stray light that is emitted from the interlayer insulation layer 29 or the gate insulation layer 28 or the buffer layer 27 towards the photosensitive semiconductor layer 220 can be blocked by the first light-shielding structure 241 or the second light-shielding structure 242, thereby further guaranteeing the accuracy of fingerprint recognition.

For example, as shown in FIG. 3 and FIG. 9, the first sub-light-shielding structure 2411 and the source/drain metal layer 26 can be formed in the same manufacturing process to reduce/simplify manufacturing processes. When forming the first sub-light-shielding structure 2411, a via hole penetrating the interlayer insulation layer 29 and the gate insulation layer 28 is first formed on the side of the interlayer insulation layer 29 and the gate insulation layer 28 facing away from the buffer layer 27. Next, the source/drain metal layer 26 is formed on the side of the interlayer insulation layer 29 facing away from the gate insulation layer 28, and the source/drain metal layer 26 is filled in the via hole penetrating the interlayer insulation layer 29 and the gate insulation layer 28, so as to form the first sub-light-shielding structure 2411 penetrating the interlayer insulation layer 29 and the gate insulation layer 28.

As shown in FIG. 3, FIG. 7, and FIG. 9, the second sub-light-shielding structure 2421 and the fourth sub-light-shielding structure 2424 may be formed in the same manufacturing process as the second light-shielding layer 32. When forming the second sub-light-shielding structure 2421 and the fourth sub-light-shielding structure 2424, a via hole penetrating the planarization layer 30, the interlayer insulation layer 29, the gate insulation layer 28 and the buffer layer 27 is first formed, then the second light-shielding layer 32 is formed on the side of the planarization layer 30 facing away from the interlayer insulation layer 29, and the second light-shielding layer 32 is filled in the via hole penetrating the planarization layer 30, the interlayer insulation layer 29, the gate insulation layer 28 and the buffer layer 27, so as to form the second sub-light-shielding structure 2421 and the fourth sub-light-shielding structure 2424 that penetrate the planarization layer 30, the interlayer insulation layer 29, the gate insulation layer 28, and the buffer layer 27.

As shown in FIG. 7 and FIG. 9, the third sub-light-shielding structure 2413 and the gate metal layer 25 can be formed during the same manufacturing process. When forming the third sub-light-shielding structure 2413, a via hole penetrating the gate insulation layer 28 and the buffer layer 27 is first formed on the side of the gate insulation layer 28 facing away from the underlay substrate 21. Next, the gate metal layer 25 is formed on the side of the gate insulation layer 28 facing away from the underlay substrate 21, and the gate metal layer 25 is filled in the via hole penetrating the gate insulation layer 28 and the buffer layer 27, so as to form the third sub-light-shielding structure 2413 penetrating the gate insulation layer 28 and the buffer layer 27.

It should be noted that in the structure shown in FIG. 9, when two ends of the third sub-light-shielding structure 2413 are respectively in contact with the first sub-light-shielding structure 2411 and the first light-shielding layer 31, a coupling capacitance inside the display module can remain unaffected by the third sub-light-shielding structure 2413 and the first sub-light-shielding structure 2411 in the present embodiment, as the third sub-light-shielding structure 2413 is fabricated in the same layer as the gate metal layer 25, and the first sub-light-shielding structure 2411 is fabricated in the same layer as the source/drain metal layer 26.

Figure 10:
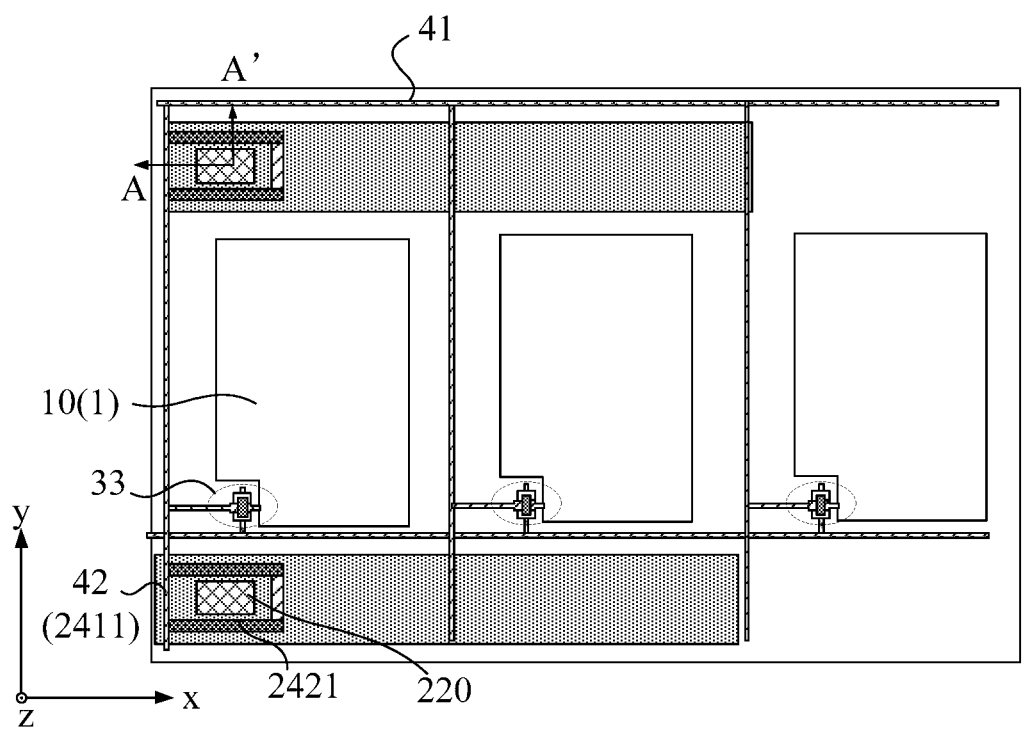
FIG. 10 is another enlarged schematic view of a position of a fingerprint recognition unit in the display module shown in FIG. 1.

FIG. 10 is another enlarged schematic view of the position of the fingerprint recognition unit in the display module shown in FIG. 1. As shown in FIG. 10, in an embodiment of the present disclosure, the orthographic projections of the first light-shielding structure 241 including the first sub-light-shielding structure 2411 and the photosensitive semiconductor layer 220 on the plane of the underlay substrate 21 are arranged in the first direction x. Therefore, the data lines 42 that are essential in the display module can be reused as the first sub-light-shielding structure 2411, so as to simplify the structure of the display module and avoid additional manufacturing processes. Thus, a film layer for blocking the stray light is unnecessary to be provided in the display module.

Figure 11:
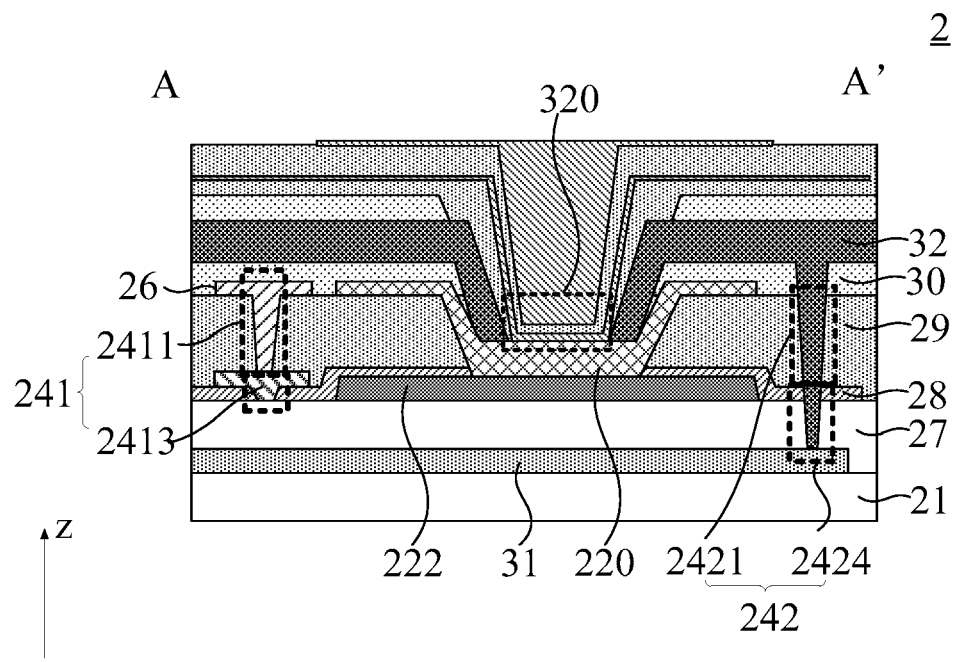
FIG. 11 is a schematic cross-sectional view of FIG. 10 taken along AA'.

For example, when the data line 42 is reused as the first sub-light-shielding structure 2411, as shown in FIG. 3, during forming the first sub-light-shielding structure 2411, the embodiment of the present disclosure can only provide the first sub-light-shielding structure 2411 without the third sub-light-shielding structure 2413, such that the data signal transmitted on the first sub-light-shielding structure 2411 will not be transmitted to the first light-shielding layer 31, thereby avoiding a relatively large coupling capacitance inside the display module. Alternatively, the third sub-light-shielding structure 2413 is provided, as shown in FIG. 11. FIG. 11 is a schematic cross-sectional view of FIG. 10 taking along AA', where the third sub-light-shielding structure 2413 penetrate only the gate insulation layer 28, and the third sub-light-shielding structure 2413 is only in contact with the first sub-light-shielding structure 2411, but not in contact with the first light-shielding layer 31.

In addition, the second light-shielding structure 242 including the second sub-light-shielding structure 2421 and the fourth sub-light-shielding structure 2424 is formed by the second light-shielding layer 32. In this regard, when forming the second light-shielding layer 32 with the light absorbing resin, due to the extension of the data lines 42 in the second direction y, if the orthographic projections of the second light-shielding structure 242 and the photosensitive semiconductor layer 220 on the plane of the underlay substrate 21 are arranged in the first direction x, it will be necessary to separately provide the data lines 42 formed by the source/drain metal layer 26 and the second light-shielding structure 242 formed by the second light-shielding layer 32 in limited space. In view of this, the process is difficult to avoid mutual interference and influence between the two structures. However, since the photosensitive semiconductor layer 220 is disposed between two adjacent sub-pixels 1 in the second direction y, the space between the two adjacent sub-pixels 1 in the second direction y is relatively large. Based on this, since the orthographic projections of the second light-shielding structure 242 and the photosensitive semiconductor layer 220 on the plane of the underlay substrate are arranged along the second direction y, i.e., the second light-shielding structure 242 is located between the photosensitive semiconductor layer 220 and the sub-pixel 1 in the second direction y, the second light-shielding structure 242 is disposed in relatively large space according to the embodiment of the present disclosure, which reduces the process difficulty and the influence of the second light-shielding structure 242 on the existing structure in the display module.

Figure 12:
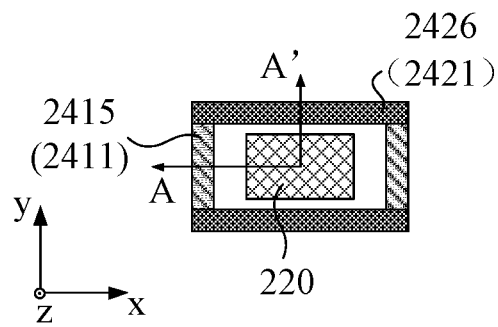
FIG. 12 is still another schematic top view of a light-shielding structure and a photosensitive semiconductor layer according to an embodiment of the present disclosure.
Figure 13:
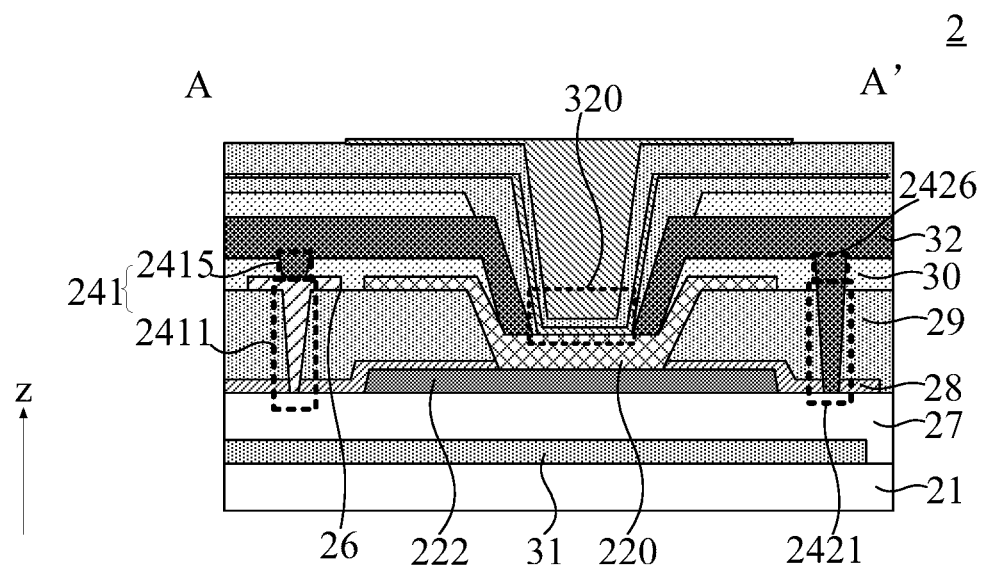
FIG. 13 is a schematic cross-sectional view of FIG. 12 taken along AA'.

FIG. 12 is still another schematic top view of the light-shielding structure and the photosensitive semiconductor layer according to an embodiment of the present disclosure, and FIG. 13 is a schematic cross-sectional view of FIG. 12 taking along AA'. In the embodiment shown in FIG. 12 and FIG. 13, the first light-shielding structure 241 includes the first sub-light-shielding structure 2411 penetrating the interlayer insulation layer 29 and the gate insulation layer 28, and a fifth sub-light-shielding structure 2415 penetrating the planarization layer 30 and in contact with the first sub-light-shielding structure 2411; and the second light-shielding structure 242 includes the second sub-light-shielding structure 2421 penetrating the interlayer insulation layer 29. Such configurations in the embodiments of the present disclosure increase the thickness of the first light-shielding structure 241, so that the stray light emitted from the planarization layer 30 can also be blocked by the first light-shielding structure 241.

In an example shown in FIG. 13, the second light-shielding structure 242 includes a sixth sub-light-shielding structure 2426 penetrating the planarization layer 30, and the sixth sub-light-shielding structure 2426 is configured to be in contact with the second sub-light-shielding structure 2421 to increase the thickness of the second light-shielding structure 242, such that the stray light emitted from the planarization layer 30 can also be blocked by the second light-shielding structure 242.

For example, the fifth sub-light-shielding structure 2415 and the sixth sub-light-shielding structure 2426 may be prepared in the same manufacturing process as the second light-shielding layer 32. For example, as shown in FIG. 12 and FIG. 13, the fifth sub-light-shielding structure 2415 and the sixth sub-light-shielding structure 2426 penetrate only the planarization layer 30, but do not penetrate the interlayer insulation layer 29 located below the planarization layer 30, and the fifth sub-light-shielding structure 2415 and the sixth sub-light-shielding structure 2426 do not affect the arrangement of the data lines 42 located at the source/drain metal layer 26. Therefore, in this case, there can be no limitations on the positions of the orthographic projections of the fifth sub-light-shielding structure 2415 and the sixth sub-lightshielding structure 2426 on the plane of the underlay substrate 21. For example, in this case, the orthographic projections of the fifth sub-light-shielding structure 2415 and the sixth sub-light-shielding structure 2426 on the plane of the underlay substrate 21 surround the photosensitive semiconductor layer 220, so as to simplify the process operation and block the stray light emitted from various directions around the photosensitive semiconductor layer 220 towards the photosensitive semiconductor layer 220.

Figure 14:
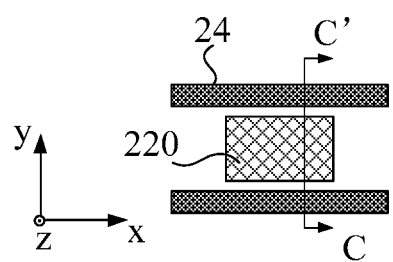
FIG. 14 is still another schematic top view of a light-shielding structure and a photosensitive semiconductor layer according to an embodiment of the present disclosure.
Figure 15:
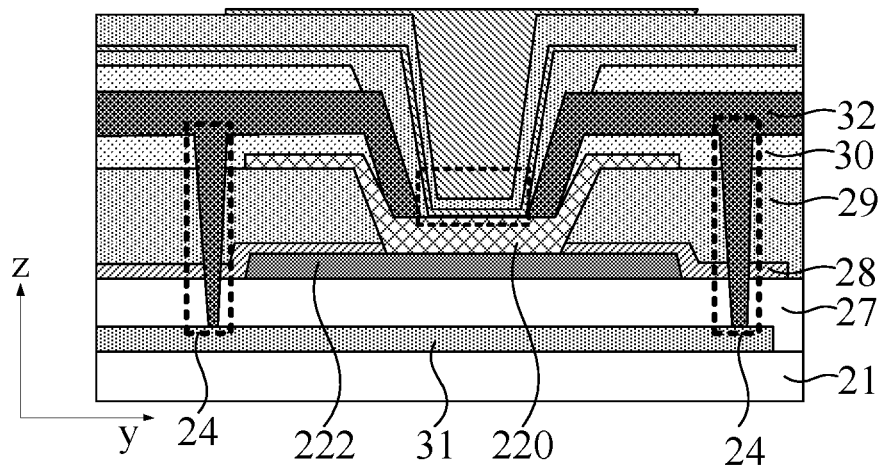
FIG. 15 is a schematic cross-sectional view of FIG. 14 taken along CC'.

The embodiments of the present disclosure described illustrate the light-shielding structure 24 that surrounds the photosensitive semiconductor layer 220. In fact, the light-shielding structure 24 may also be disposed on a portion of the photosensitive semiconductor layer 220, as shown in FIG. 14 and FIG. 15. FIG. 14 is still another schematic top view of a light-shielding structure and a photosensitive semiconductor layer according to an embodiment of the present disclosure, and FIG. 15 is a schematic cross-sectional view of FIG. 14 taken along CC'. The orthographic projections of the light-shielding structure 24 and the photosensitive semiconductor layer 220 on the plane of the underlay substrate 21 are arranged in the second direction y. Further, the light-shielding structure 24 penetrates the planarization layer 30, the interlayer insulation layer 29, the gate insulation layer 28, and the buffer layer 27. The light-shielding structure 24 and the second light-shielding layer 32 are formed in the same manufacturing process. That is, during the formation of the light-shielding structure 24, the buffer layer 27, the gate insulation layer 28, the interlayer insulation layer 29, and the planarization layer 30 are sequentially first stacked, and then the planarization layer 30, the interlayer insulation layer 29, the gate insulation layer 28, and the buffer layer 27 are etched to form a via hole penetrating the planarization layer 30, the interlayer insulation layer 29, the gate insulation layer 28 and the buffer layer 27. After that, the second light-shielding layer 32 is formed, and the second light-shielding layer 32 is filled in the via hole penetrating the planarization layer 30, the interlayer insulation layer 29, the gate insulation layer 28, and the buffer layer 27, so as to form the light-shielding structure 24 penetrating the planarization layer 30, the interlayer insulation layer 29, the gate insulation layer 28, and the buffer layer 27. When the second light-shielding layer 32 is formed with the light absorbing resin, as described above, the data line 42 extends in the second direction y, the data lines 42 formed by the source/drain metal layer 26, and the light-shielding structure 24 formed by the second light-shielding layer 32 are required to be separately provided in limited space, in order to arrange the orthographic projections of the light-shielding structure 24 and the photosensitive semiconductor layer 220 on the plane of the underlay substrate 21 in the first direction x. In this regard, the processing is difficult in order to avoid mutual interference and influence between the two structures. In addition, since the photosensitive semiconductor layer 220 is disposed between two adjacent sub-pixels 1 in the second direction y, space between the two adjacent sub-pixels 1 in the second direction y is relatively large. Based on this, in the embodiment of the present disclosure, since the orthographic projections of the light-shielding structure 24 and the photosensitive semiconductor layer 220 on the plane of the underlay substrate are arranged along the second direction y, i.e., the light-shielding structure 24 is located between the photosensitive semiconductor layer 220 and the sub-pixel 1 in the second direction y, the light-shielding structure 24 can be provided in relatively large space, which is helpful to reduce the process difficulty and influence of the light-shielding structure 24 on the existing structure in the display module.

It should be understood that the material of the above-mentioned light-shielding structure is merely illustrative, and not specifically limited by the present disclosure. In an actual process of manufacturing the light-shielding structure, the material of the light-shielding structure can be selected by also taking into consideration design of other components in vicinity of the light-shielding structure, as long as the stray light can be blocked. For example, other materials, such as a material having higher reflectance or a material having a higher light absorbance, may be used to form the light-shielding structure.

For example, as shown in FIG. 3, the fingerprint recognition unit 22 further includes a first signal transmission layer 221 and a second signal transmission layer 222. The first signal transmission layer 221 is located at a side of the photosensitive semiconductor layer 220 facing away from the underlay substrate 21. The second signal transmission layer 222 is located on a side of the photosensitive semiconductor layer 220 close to the underlay substrate 21. The first signal transmission layer 221 includes a transparent electrode. The transparent electrode, for example, may be formed by Indium Tin Oxide (hereinafter referred to as ITO) or Indium Zinc Oxide (hereinafter referred to as IZO), in order to ensure transmissivity of light through the first signal transmission layer 221, such that the photosensitive semiconductor layer 220 located on the side of the first signal transmission layer 221 close to the underlay substrate 21 can normally receive the light reflected by the touch body.

For example, the second signal transmission layer 222 and the active layer 334 of the thin film transistor described above can be formed in the same manufacturing process.

Figure 16:
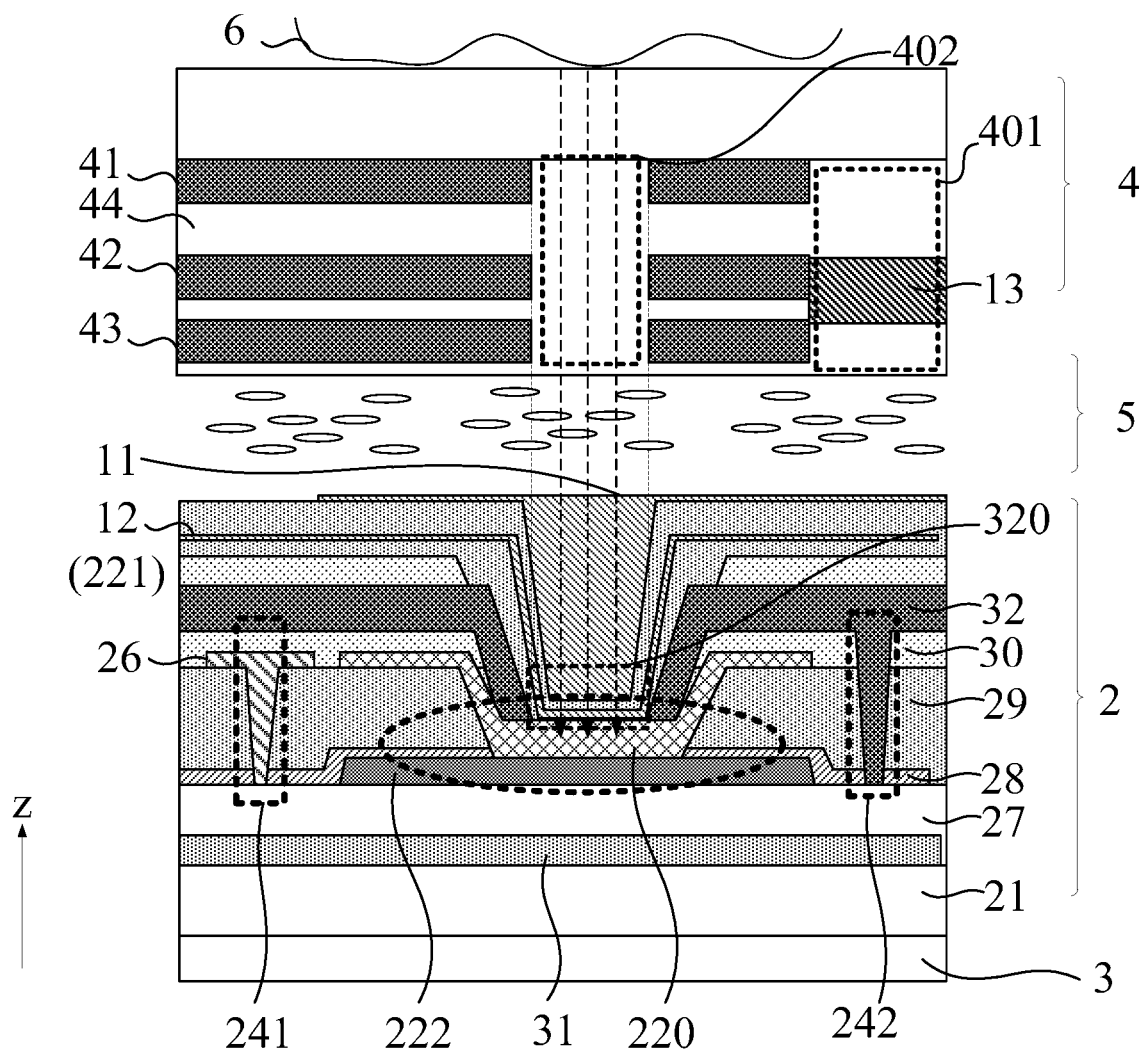
FIG. 16 is a schematic cross-sectional view of a display module according to an embodiment of the present disclosure.

For example, the display module can be a liquid crystal display module, as shown in FIG. 16. FIG. 16 is a schematic cross-sectional view of a display module according to an embodiment of the present disclosure. The display module further includes a backlight module 3, a color film substrate 4, and a liquid crystal layer 5 located between the array substrate 2 and the color film substrate 4. The backlight module 3 can be reused as a light source of the fingerprint recognition unit 22.

The above sub-pixel 1 includes a pixel electrode 11, a common electrode 12, and a color resist layer 13. The pixel electrode 11 and the common electrode 12 are located on the side of the photosensitive semiconductor layer 220 facing away from the underlay substrate 21. The color resist layer 13 is located on the color film substrate 4. The color resist layer 13 is provided to filter the light emitted through the liquid crystal layer 5, such that each sub-pixel has a corresponding color. During the displaying of the display module, a driving circuit (not shown) in the array substrate 2 provides a voltage to the pixel electrode 11 and the common electrode 12, and liquid crystal molecules in the liquid crystal layer 5 may be deflected under a voltage difference therebetween, so that the light emitted by the backlight module 3 is emitted through the liquid crystal layer 5, and color display of the display module is achieved by the color resist layer 13 in the color film substrate 4.

In an embodiment, the first signal transmission layer 221 may be reused as the common electrode 12, which simplifies the structure in the display module. During the fingerprinting recognition, the first signal transmission layer 221 and the second signal transmission layer 222 are configured to supply the photosensitive semiconductor layer 220 with a voltage required for the operation of the fingerprint recognition unit. During the displaying of the display module, the first signal transmission layer 221 and the pixel electrode 11 provide the liquid crystal layer 5 with a voltage required for the deflection of the liquid crystal layer.

For example, the above color film substrate 4 further includes a plurality of black matrix layers arranged in a thickness direction of the color film substrate 4. As shown in FIG. 16, the color film substrate 4 includes a first black matrix layer 41, a second black matrix layer 42, and a third black matrix layer 43, which are arranged along the thickness direction of the color film substrate 4. The color film substrate 4 further includes transparent optical adhesive layers 44 located between every two adjacent black matrix layers. As shown in FIG. 16, the first black matrix layer 41, the second black matrix layer 42 and the third black matrix layer 43 include a first hollow portion 401 and a second hollow portion 402, and the first hollow portion 401 defines a position of the color resist layer 13.

In an embodiment of the present disclosure, by providing the first black matrix layer 41, the second black matrix layer 42, and the third black matrix layer 43 and by limiting the color resist layer 13 for filtering light at the position where the first hollow portion 401 is located, the above black matrix layers can block the non-display structures including the scan line 41, the data line 42, and the thin film transistor 33, thus avoiding the mutual interference between the light emitted by the adjacent two color resist layers 13, and thereby guaranteeing the display effect of the display module. For example, the first hollow portion 401 corresponds to the sub-pixel region 10 shown in FIG. 4.

Moreover, in the embodiment of the present disclosure, the second hollow portion 402 at least partially overlaps with the photosensitive semiconductor layer 220 in a direction perpendicular to the plane of the underlay substrate 21 is located, i.e., in the direction z shown in FIG. 16, and thus the second hollow portion 402 forms a collimating hole that transmits the reflected light reflected by the finger 6 to the photosensitive semiconductor layer 220. In this way, the light reflected by different positions of the finger can be prevented from being transmitted to the photosensitive semiconductor layer 220 at a corresponding position of the same collimating hole, thereby further guaranteeing the accuracy of fingerprint recognition.

Figure 17:
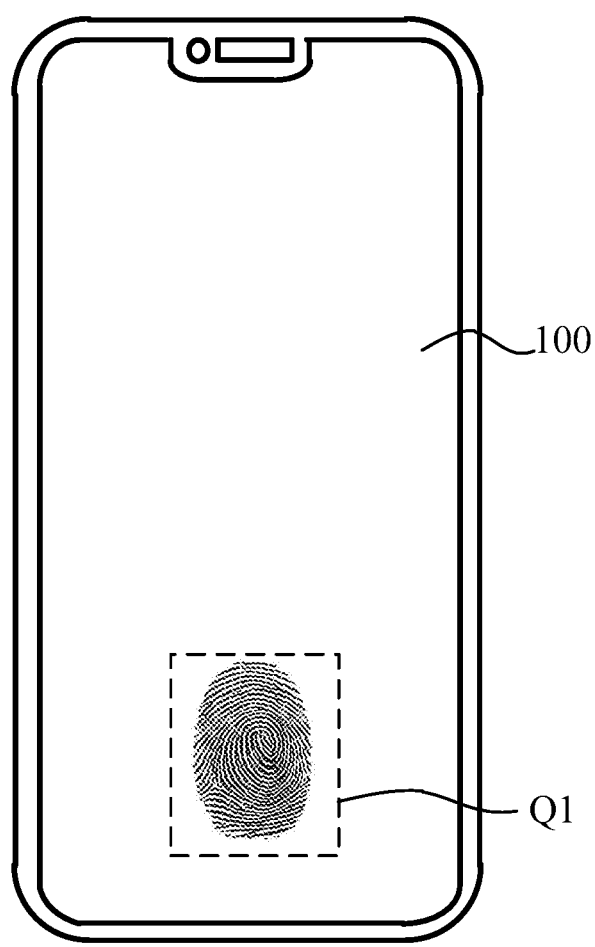
FIG. 17 is a schematic view of a display apparatus according to an embodiment of the present disclosure.

An embodiment of the present disclosure further provides a display apparatus, as shown in FIG. 17. FIG. 17 is a schematic view of a display apparatus according to an embodiment of the present disclosure. The display apparatus includes the display module 100 described above, and the display module 100 includes the fingerprint recognition region Q1 described above. The specific structure of the display module 100 has been described in detail in the foregoing embodiments, which are not described herein again. The display apparatus shown in FIG. 17 is merely illustrative, and the display apparatus may be any display apparatus having a display function, such as an electronic window, smart glasses, a vehicle display screen, a mobile phone, a tablet computer, a notebook computer, an electronic paper book, or a television.

In the display apparatus provided by the present disclosure, the first light-shielding layer is provided in the array substrate and disposed on the side of the photosensitive semiconductor layer close to the underlay substrate, and the orthographic projection of the first light-shielding layer on the plane of the photosensitive semiconductor layer completely covers the photosensitive semiconductor layer, such that the first light-shielding layer can block the light emitted from the light source on the other side of the underlay substrate and directly incident to the photosensitive semiconductor layer. That is, it is possible to prevent the stray light that cannot reveal the fingerprint recognition information from being incident on the photosensitive semiconductor layer, and to avoid interference of the stray light on fingerprint recognition, which is advantageous for improving the accuracy of fingerprint recognition.

Moreover, in the embodiment of the present disclosure, by setting the length of the first light-shielding layer in the first direction to be larger than or equal to twice the length of the sub-pixel in the first direction, the first light-shielding layer can have an sufficient area to block all the light emitted from a light source and incident to the photosensitive semiconductor layer from various directions, thereby further guaranteeing the accuracy of fingerprint recognition.

The above is only the preferred embodiment of the present disclosure and is not intended to limit the present disclosure. Any modifications, equivalent substitutions, improvements, and the like made within the spirit and scope of the present disclosure shall fall within the scope of the present disclosure.

What is claimed is:

1. A display module, comprising:
a plurality of sub-pixels arranged in an array along a first direction and a second direction, wherein the first direction intersects the second direction; and
an array substrate comprising an underlay substrate, a fingerprint recognition unit, a first light-shielding layer, and a plurality of thin film transistors,
wherein the fingerprint recognition unit comprises a photosensitive semiconductor layer, and an orthographic projection of the photosensitive semiconductor layer on a plane of the underlay substrate is located between two sub-pixels of the plurality of sub-pixels that are adjacent along the second direction,
wherein the first light-shielding layer is located on a side of the photosensitive semiconductor layer close to the underlay substrate, and an orthographic projection of the first light-shielding layer on a plane of the photosensitive semiconductor layer completely covers the photosensitive semiconductor layer, and a length of the first light-shielding layer along the first direction is larger than or equal to twice a length of each of the plurality of sub-pixels along the first direction,
wherein the array substrate further comprises a light-shielding structure located on a side of the first light-shielding layer facing away from the underlay substrate, and an orthographic projection of the light-shielding structure on the plane of the underlay substrate at least partially overlaps an orthographic projection of the first light-shielding layer on the plane of the underlay substrate,
wherein the light-shielding structure is far away from each of ends of the first light-shielding layer arranged in the first direction and is far away from each of ends of the first light-shielding layer arranged in the second direction;
wherein, in a direction perpendicular to the plane of the underlay substrate, the light-shielding structure does not overlap with the photosensitive semiconductor layer;
wherein the array substrate further comprises a gate metal layer, a source/drain metal layer, a gate insulation layer, and an interlayer insulation layer; the gate metal layer is located on a side of the gate insulation layer facing away from the underlay substrate, the interlayer insulation layer is located on a side of the gate metal layer facing away from the underlay substrate, and the source/drain metal layer is located on a side of the interlayer insulation layer facing away from the underlay substrate;

wherein the array substrate further comprises a plurality of scan lines, and a plurality of data lines, wherein the plurality of thin film transistors is connected to the plurality of scan lines and the plurality of data lines; the plurality of scan lines extends along the first direction and is arranged along the second direction, and the plurality of data lines extends along the second direction and is arranged along the first direction; the plurality of scan lines and the plurality of data lines intersect to define a plurality of sub-pixel regions, and the plurality of sub-pixels is located in the plurality of sub-pixel regions;

wherein each of the plurality of thin film transistors comprises a gate, a source, a drain, and an active layer;

wherein the gate and the plurality of scan lines are located in the gate metal layer;

wherein the source, the drain, and the plurality of data lines are located in the source/drain metal layer; and wherein the gate insulation layer and the interlayer insulation layer include a first via hole, and the photosensitive semiconductor layer is located within the first via hole.

2. The display module according to claim 1, wherein a shortest distance between an edge of the orthographic projection of the first light-shielding layer on the plane of the photosensitive semiconductor layer and an edge of the photosensitive semiconductor layer is greater than 6.5 μm.

3. The display module according to claim 1, wherein an orthographic projection of the light-shielding structure on the plane of the photosensitive semiconductor layer surrounds the photosensitive semiconductor layer.

4. The display module according to claim 1, wherein the array substrate further comprises a buffer layer; the buffer layer is located on the side of the first light-shielding layer facing away from the underlay substrate, the gate insulation layer is located on a side of the buffer layer facing away from the underlay substrate; and wherein the active layer is located between the buffer layer and the gate insulation layer.

5. The display module according to claim 4, wherein the array substrate further comprises a second light-shielding layer that is located on a side of the source/drain metal layer facing away from the underlay substrate; and a planarization layer is provided between the source/drain metal layer and the second light-shielding layer; and wherein the second light-shielding layer comprises a hollow portion, and the hollow portion at least partially overlaps the photosensitive semiconductor layer in the direction perpendicular to the plane of the underlay substrate.

6. The display module according to claim 5, wherein a material of the second light-shielding layer comprises a light absorbing resin.

7. The display module according to claim 5, wherein the light-shielding structure comprises a first light-shielding structure and a second light-shielding structure, wherein an orthographic projection of the first light-shielding structure and the orthographic projection of the photosensitive semiconductor layer on the plane of the underlay substrate are arranged along the first direction, and wherein an orthographic projection of the second light-shielding structure and the orthographic projection of the photosensitive semiconductor layer on the plane of the underlay substrate are arranged along the second direction;

wherein the first light-shielding structure comprises a first sub-light-shielding structure penetrating the interlayer insulation layer and the gate insulation layer, and the second light-shielding structure comprises a second sub-light-shielding structure penetrating the interlayer insulation layer and the gate insulation layer.

8. The display module according to claim 7, wherein:

the first light-shielding structure further comprises a fifth sub-light-shielding structure penetrating the planarization layer and being in contact with the first sub-light-shielding structure;

the fifth sub-light-shielding structure and the second light-shielding layer are formed in a same manufacturing process; and the first sub-light-shielding structure and the source/drain metal layer are formed in a same manufacturing process.

9. The display module according to claim 5, wherein the light-shielding structure comprises a first light-shielding structure and a second light-shielding structure, an orthographic projection of the first light-shielding structure and the orthographic projection of the photosensitive semiconductor layer on the plane of the underlay substrate are arranged along the first direction, and an orthographic projection of the second light-shielding structure and the orthographic projection of the photosensitive semiconductor layer on the plane of the underlay substrate are arranged along the second direction; and wherein the first light-shielding structure comprises a third sub-light-shielding structure penetrating the gate insulation layer and the buffer layer, and the second light-shielding structure comprises a fourth sub-light-shielding structure penetrating the gate insulation layer and the buffer layer.

10. The display module according to claim 5, wherein the light-shielding structure and the second light-shielding layer are formed in a same manufacturing process, and the light-shielding structure penetrates the planarization layer, the interlayer insulation layer, the gate insulation layer, and the buffer layer; and wherein an orthographic projection of the light-shielding structure and the orthographic projection of the photosensitive semiconductor layer on the plane of the underlay substrate are arranged in the second direction.

11. The display module according to claim 5, wherein the light-shielding structure comprises a first light-shielding structure and a second light-shielding structure, wherein an orthographic projection of the first light-shielding structure and the orthographic projection of the photosensitive semiconductor layer on the plane of the underlay substrate are arranged along the first direction, and wherein an orthographic projection of the second light-shielding structure and the orthographic projection of the photosensitive semiconductor layer on the plane of the underlay substrate are arranged along the second direction;

wherein the first light-shielding structure comprises a first sub-light-shielding structure penetrating the interlayer insulation layer, and a third sub-light-shielding structure penetrating the gate insulation layer and the buffer layer; and the second light-shielding structure comprises a second sub-light-shielding structure penetrating the interlayer insulation layer, and a fourth sub-light-shielding structure penetrating the gate insulation layer and the buffer layer.

12. The display module according to claim 5, wherein the light-shielding structure comprises a first light-shielding structure and a second light-shielding structure, wherein an orthographic projection of the first light-shielding structure and the orthographic projection of the photosensitive semiconductor layer on the plane of the underlay substrate are arranged along the first direction, and wherein an orthographic projection of the second light-shielding structure and the orthographic projection of the photosensitive semiconductor layer on the plane of the underlay substrate are arranged along the second direction;

wherein the first light-shielding structure comprises a first sub-light-shielding structure penetrating the interlayer insulation layer, and a third sub-light-shielding structure penetrating the gate insulation layer; and the second light-shielding structure comprises a second sub-light-shielding structure penetrating the interlayer insulation layer, and a fourth sub-light-shielding structure penetrating the gate insulation layer and the buffer layer.

13. The display module according to claim 1, wherein the display module has a fingerprint recognition region and a non-fingerprint recognition region, and the photosensitive semiconductor layer is located in the fingerprint recognition region; and wherein an area of each of the plurality of sub-pixels located in the fingerprint recognition region is smaller than an area of each of the plurality of sub-pixels located in the non-fingerprint recognition region.

14. The display module according to claim 13, further comprising a backlight module, a color film substrate, and a liquid crystal layer located between the array substrate and the color film substrate, wherein each of the plurality of sub-pixels comprises a pixel electrode, a common electrode, and a color resist layer, the pixel electrode and the common electrode are located on the side of the photosensitive semiconductor layer facing away from the underlay substrate, the color resist layer is located on the color film substrate, and the backlight module is reused as a light source of the fingerprint recognition unit.

15. The display module according to claim 1, wherein the fingerprint recognition unit further comprises a first signal transmission layer and a second signal transmission layer, the first signal transmission layer is located on a side of the photosensitive semiconductor layer facing away from the underlay substrate, and the second signal transmission layer is located on a side of the photosensitive semiconductor layer close to the underlay substrate; and wherein the first signal transmission layer comprises a transparent electrode, and the second signal transmission layer and an active layer are formed in a same manufacturing process.

16. The display module according to claim 15, wherein the first signal transmission layer is reused as a common electrode.

17. The display module according to claim 15, wherein the color film substrate comprises a plurality of black matrix layers arranged along a thickness direction of the color film substrate, and each of the plurality of black matrix layers comprises a first hollow portion and a second hollow portion, wherein the first hollow portion defines a position of the color resist layer, and wherein the second hollow portion at least partially overlaps the photosensitive semiconductor layer in the direction perpendicular to the plane of the underlay substrate.

18. A display apparatus, comprising a display module, the display module comprising:

a plurality of sub-pixels arranged in an array along a first direction and a second direction, wherein the first direction intersects the second direction; and an array substrate comprising an underlay substrate, a fingerprint recognition unit, a first light-shielding layer, and a plurality of thin film transistors, wherein the fingerprint recognition unit comprises a photosensitive semiconductor layer, and an orthographic projection of the photosensitive semiconductor layer on a plane of the underlay substrate is located between two sub-pixels of the plurality of sub-pixels that are adjacent along the second direction, wherein the first light-shielding layer is located on a side of the photosensitive semiconductor layer close to the underlay substrate, and an orthographic projection of the first light-shielding layer on a plane of the photosensitive semiconductor layer completely covers the photosensitive semiconductor layer, and a length of the first light-shielding layer along the first direction is larger than or equal to twice a length of each of the plurality of sub-pixels along the first direction, wherein the array substrate further comprises a light-shielding structure located on a side of the first light-shielding layer facing away from the underlay substrate, and an orthographic projection of the light-shielding structure on the plane of the underlay substrate at least partially overlaps an orthographic projection of the first light-shielding layer on the plane of the underlay substrate, wherein the light-shielding structure is far away from each of ends of the first light-shielding layer arranged in the first direction and is far away from each of ends of the first light-shielding layer arranged in the second direction;

wherein, in a direction perpendicular to the plane of the underlay substrate, the light-shielding structure does not overlap with the photosensitive semiconductor layer;

wherein the array substrate further comprises a gate metal layer, a source/drain metal layer, a gate insulation layer, and an interlayer insulation layer; the gate metal layer is located on a side of the gate insulation layer facing away from the underlay substrate, the interlayer insulation layer is located on a side of the gate metal layer facing away from the underlay substrate, and the source/drain metal layer is located on a side of the interlayer insulation layer facing away from the underlay substrate;

wherein the array substrate further comprises a plurality of scan lines, and a plurality of data lines, wherein the plurality of thin film transistors is connected to the plurality of scan lines and the plurality of data lines; the plurality of scan lines extends along the first direction and is arranged along the second direction, and the plurality of data lines extends along the second direction and is arranged along the first direction; the plurality of scan lines and the plurality of data lines intersect to define a plurality of sub-pixel regions, and the plurality of sub-pixels is located in the plurality of sub-pixel regions;

wherein each of the plurality of thin film transistors comprises a gate, a source, a drain, and an active layer;

wherein the gate and the plurality of scan lines are located in the gate metal layer;

wherein the source, the drain, and the plurality of data lines are located in the source/drain metal layer; and wherein the gate insulation layer and the interlayer insulation layer include a first via hole, and the photosensitive semiconductor layer is located within the first via hole.

\* \* \* \* \*